United States Patent

[11] 3,601,171

| [72] | Inventor | Michael William Farrow<br>"Seagavin," Brick Farm Drayton Norwich,<br>Norfolk, England |
|---|---|---|
| [21] | Appl. No. | 814,420 |
| [22] | Filed | Apr. 8, 1969 |
| [45] | Patented | Aug. 24, 1971 |
| [32] | Priority | Apr. 8, 1968, Mar. 5, 1969 |
| [33] | | Great Britain |
| [31] | | 16716/68 and 11763/69 |

[54] VEGETABLE-TOPPING MACHINE
8 Claims, 4 Drawing Figs.

[52] U.S. Cl. ............................................ 146/81 R
[51] Int. Cl. ............................................. A23n 15/04
[50] Field of Search .......... ............................. 146/81, 83, 85, 86

[56] References Cited
UNITED STATES PATENTS

| 1,124,972 | 1/1915 | Talley | 146/85 |
| 3,080,904 | 3/1963 | Carmichael | 146/81 |
| 1,390,663 | 9/1921 | Wyckoff | 146/85 X |
| 3,382,903 | 5/1968 | Kibler, Sr. et al. | 146/81 X |

FOREIGN PATENTS

| 1,242,544 | 8/1960 | France | 146/81 |
| 830,998 | 3/1960 | Great Britain | 146/81 |

Primary Examiner—Willie G. Abercrombie
Attorney—Holman and Stern

ABSTRACT: A machine for topping vegetables such as carrots in which the vegetables are delivered to the outside of a rotating cage formed with spaced circumferential bars through which undersize vegetables fall onto a chute interiorly of the cage for discharge while oversize vegetables are aligned and trapped between the bars and then passed across a cutting knife which severs the tops and the topped vegetables are then pressed out from the bars.

Fig. 1.

INVENTOR
MICHAEL WILLIAM FARROW
ATTORNEYS 3,601,171

VEGETABLE-TOPPING MACHINE

BACKGROUND OF THE INVENTION

The present invention relates to machines for automatically topping tapered vegetables, particularly root vegetables (e.g., carrots, parsnips, etc.).

When such vegetables are harvested, the majority of the green foilage growing from the vegetable is cut off at the same time. However, the top of the vegetable with the remaining stumps of the green foilage must be removed before commercial processing for canning, deep freezing, etc. takes place. Usually this topping of the vegetable is done by hand, and the process is therefore extremely time consuming.

An object of the present invention is to provide a machine which will top tapered vegetables automatically and continuously. A machine according to the invention also inherently facilitates the sorting or grading of the vegetables as to size if desired.

SUMMARY OF THE INVENTION

The present invention consists in a machine for topping tapered vegetables comprising endless conveyor means having transverse, spaced bars, vegetable orientating means for orienting vegetables fed onto the conveyor so that any vegetables whose largest diameter is less than the spacing between the bars fall through the bars for discharge from the machine while larger vegetables become trapped between the bars with their tops projecting, and stationary cutting means positioned to engage and sever the projecting vegetable tops as these are moved by the conveyor means through a cutting station.

In the accompanying drawings which illustrate the invention by way of example:

BRIEF DESCRIPTION OF THE DRAWING

FIG. 1 represents diagrammatically a front view of machine according to the present invention.

DETAILED DESCRIPTION OF THE INVENTION

Figure 1:
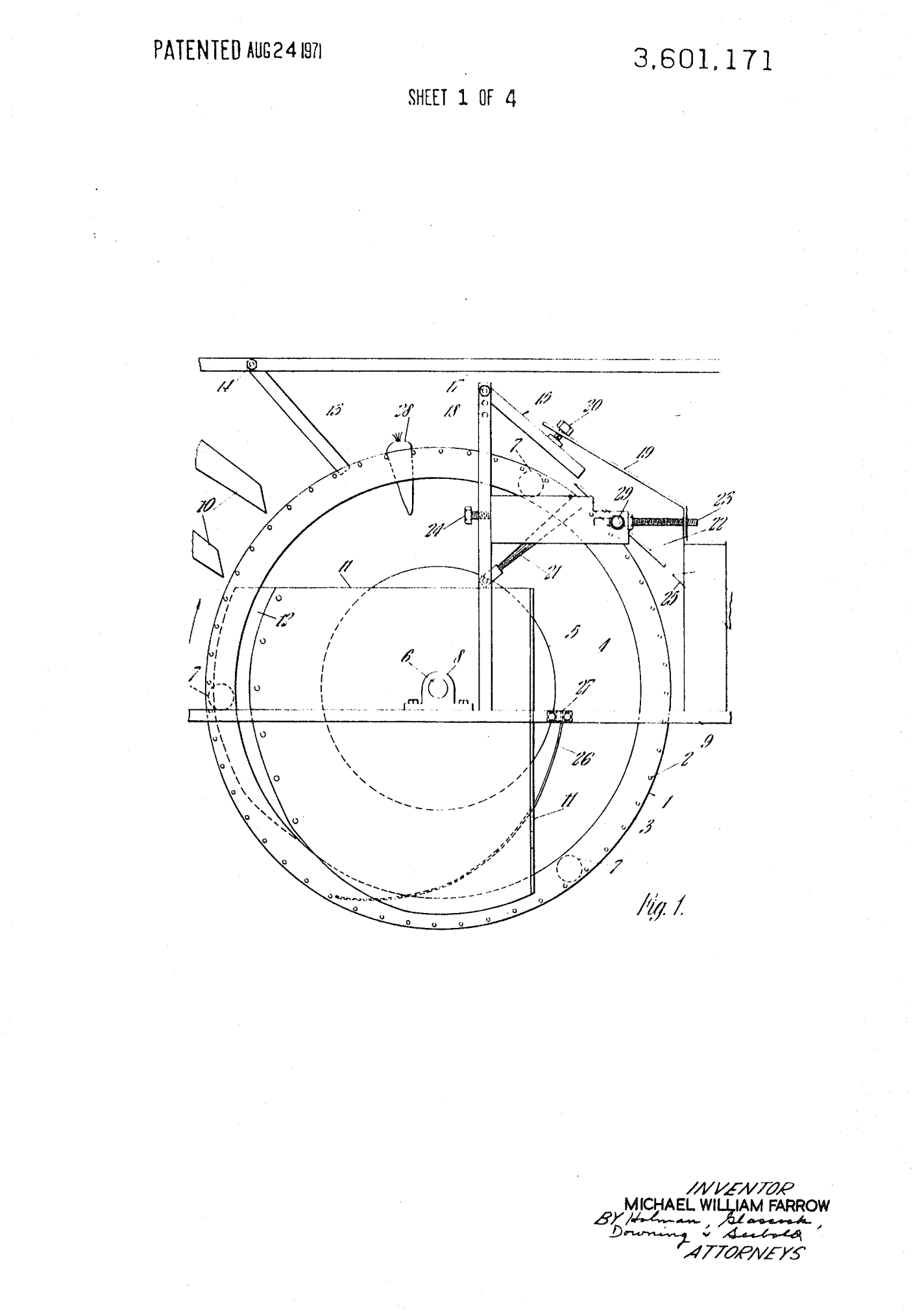
Figure 2:
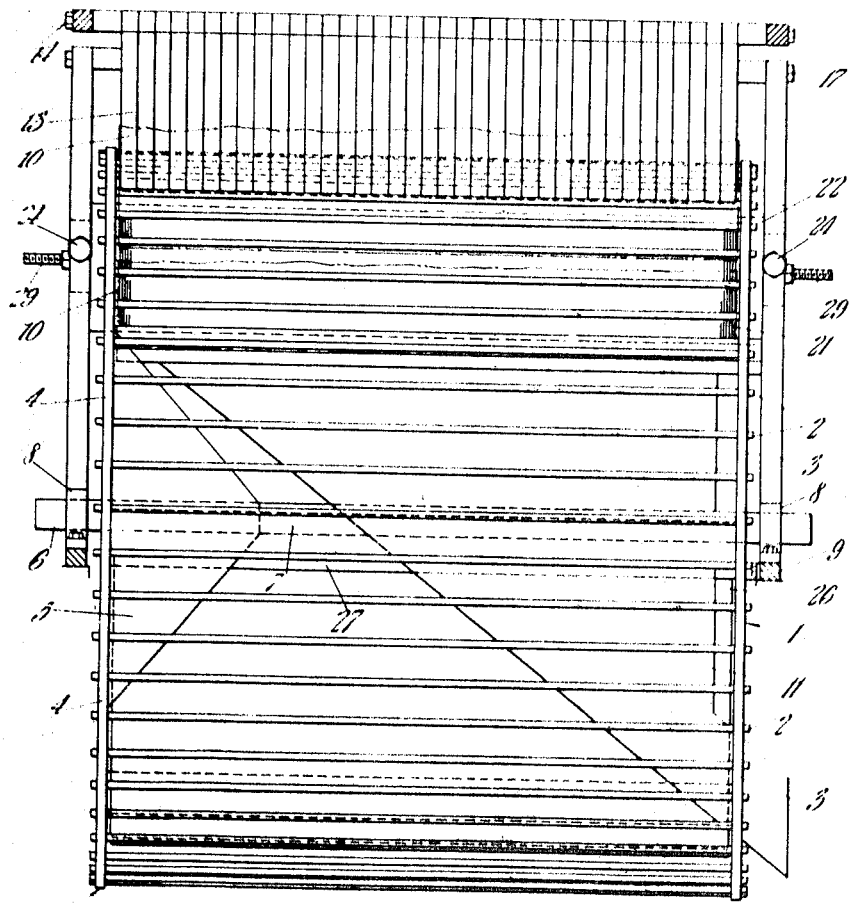
FIG. 2 represents a side view of said machine of FIG. 1.
Figure 3:
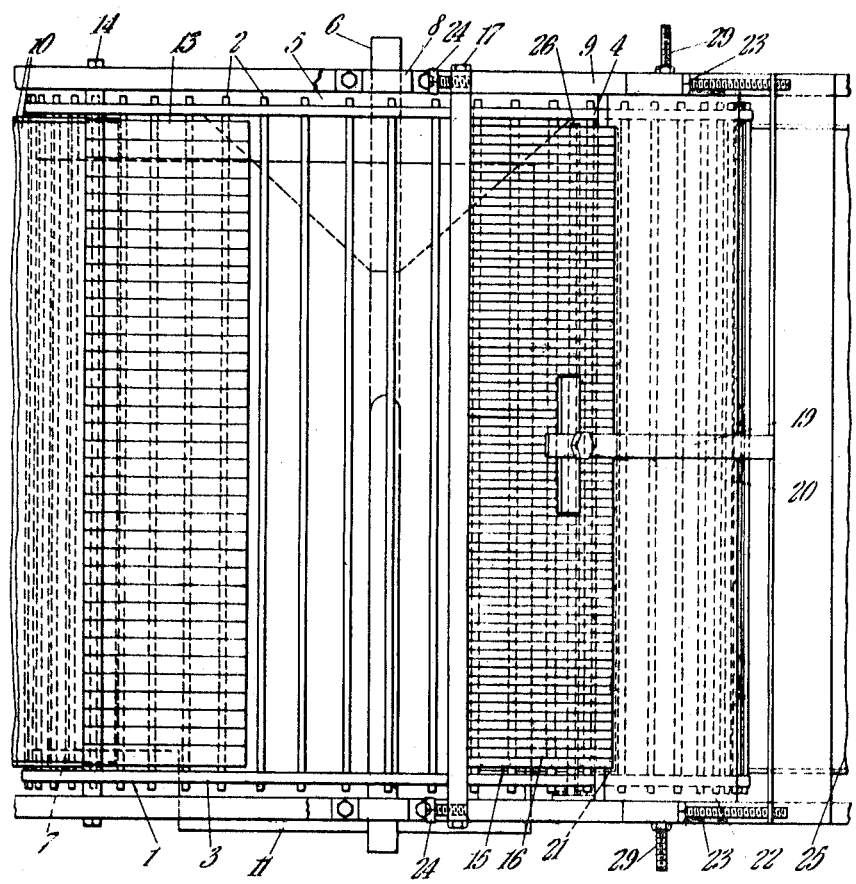
FIG. 3 represents a plan view of the machine according to FIG. 1.

In carrying the invention into effect according to one convenient mode by way of example, a carrot-topping machine as shown in FIGS. 1 to 3 includes a tubular cage 1 formed by a plurality of parallel horizontal bars 2, spaced around the circumference of two circular end plates 3, 4. End plate 3 is a disc, and together with a conical support member 5, attached by its basal periphery to said plate 4, supports cage 1 on a horizontal axle 6, which passes longitudinally of the cage 1 through a central aperture on plate 3 and the apex of member 5. End plate 4 is annular and is connected to plate 3 by bars 7 additional to bars 2.

The bars 2 are flexible so as to be capable of vibration and are conveniently formed from high tensile steel.

Axle 6 is mounted in bearings 8 supported by surface 9. Driving means (not shown in the drawings) are provided to rotate the axle 6 and therefore cage 1 about its horizontal axis at a steady speed. The direction of rotation for the cage, as shown in FIG. 1 is clockwise.

The vegetable to be topped, in this case carrots, is delivered to the outside of cage 1 by chutes 10, two chutes being used to increase the capacity of the machine. The spacing of bars 2 is such as to select a given grade of size of carrot. Smaller carrots therefore fall through the gaps between bars 2 into a fixed chute 11 which delivers them out of the cage 1 through the annular hole in the end plate 4. These carrots can then be fed to a similar machine with a smaller spacing of bars 2 to select the next grade and so on so that a series of machines in a cascade arrangement can be used to grade and top the carrots. The base of chute 11 is extended sideways by an attached rubber flap 12 shaped to follow the contour of the cage as it rotates, to catch any carrots which miss the main part of chute 11.

The carrots remaining on the bars 2 of the cage 1 rotate with the latter and pass a row of metal flaps 13 pivotably mounted on an axis 14 extending longitudinally of the cage 1. The flaps 13, under the action of their own weight, interfere with the carrots and bars 2 tending to push any remaining small carrots between the bars and also help the correct-size carrots to come into the correct position for further processing which, as illustrated by a carrot 28 in FIG. 1, entails the tips of the carrots projecting into the cage, the carrots being supported at or near their tops by adjacent bars of bars 2. This correct positioning of the carrots is further helped by vibrations set up in bars 2 by the buffeting action of the flaps 13.

The carrots, now in the correct position, are carried around to a further set 15 of flaps 16, pivotably mounted on an axis 17 extending longitudinally of the cage 1. Flaps 16 are not pivotably movable relative to one another and are preferably arranged with their edges in a vertical plane.

The pivotal axis 17 can be adjusted in a vertical direction by using different sets of pivot points 18. A fixed member 19 extends over the flaps 16 and has an adjustable screw and plate assembly 20 at its free end. Assembly 20 limits the vertical movement of flaps 16. As the carrots are brought under flaps 16, they are pushed down between the bars 2 by flaps 16 so that only the required height of carrot for topping protrudes above bars 2, with this height being adjustable by assembly 20. Any carrots actually pushed completely through the bars 2 during this part of the operation are deflected in falling, by a longitudinally extending brush 21, into the chute 11.

As the carrots emerge from under flaps 16 they are brought against a longitudinally extending cutting blade 22 adjustably in position by means of screws 23 and 24. The carrot tops are thereby cut off and fall away down a chute 23. The remainder of the carrots, still held between the bars 2, are carried around by the cage 1 until the body of each carrot is knocked by the heavy rubber flap 26 suspended from a bar 27 which extends longitudinally of the cage and is supported by surfaces 9. Flap 26 dislodges the carrots from between the bars 2 and the carrots fall away to be collected and packed.

The cutting blade 22 can be tensioned by tensioning bolts 28. Bars 2 can also be tensioned by adjusting nuts on their ends (not shown).

While the embodiment described has conveyor means in the form of a drumlike cage it will be appreciated that other suitable means may be used for example an endless means comprising two endless belts spaced apart between which the set of transverse parallel bars is connected.

Figure 4:
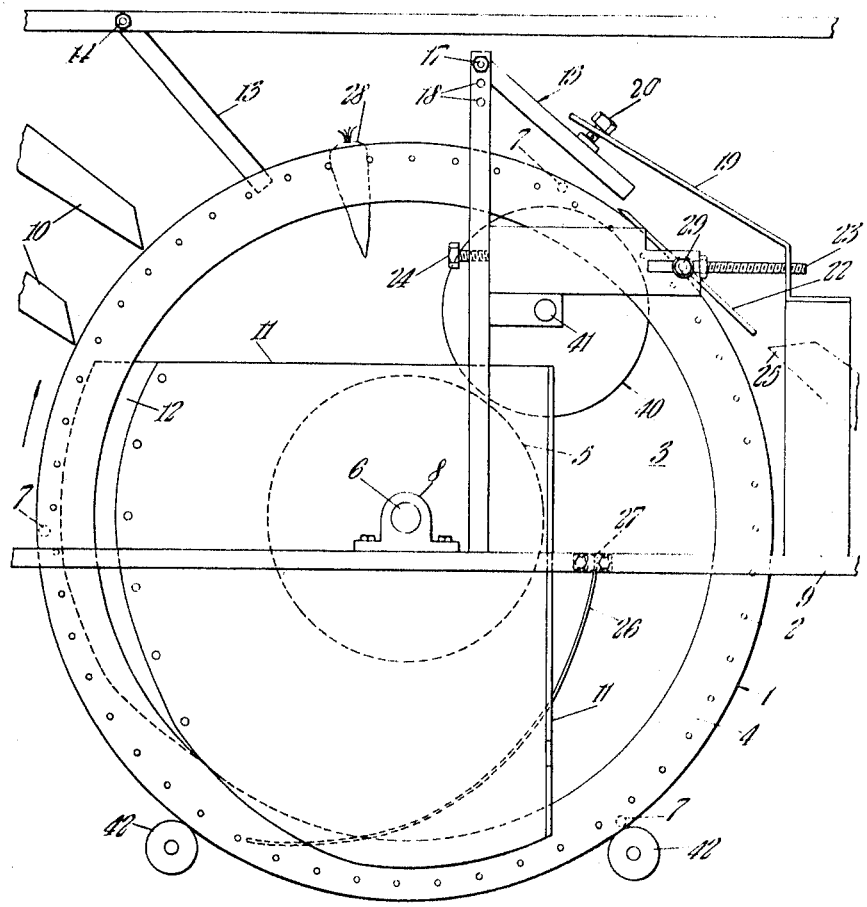
FIG. 4 is a side view of a modified machine.

FIG. 4 shows a modified version of the machine shown in FIGS. 1 to 3 and since the machines are basically similar in construction and operation like reference numerals are used to refer to like parts of the machines and only their differences will now be described.

In place of the brushes 21 shown in FIGS. 1 to 3, the FIG. 4 machine has a roller 40 of sponge or foam rubber, synthetic plastic or like soft resilient material freely rotatably mounted internally of the drum on an axis 41 (any convenient mounting means being used) with the roller periphery engaging the inside of the bars 2 under the front of blade 22 and bars 15. With this arrangement, the roller rotates by friction with the cage and affords support for vegetables in the region of the blade and bars 15 tending to prevent the latter pushing the vegetables through the bars. With this arrangement, the bars 7 are positioned outside the bars 2.

According to another feature of the invention, the cage itself of this type of machine or the machine shown in FIGS. 1 to 3 can be driven frictionally by rollers 42 driven from a suitable source and operating on flanges of the end plates 3 and 4.

I claim:

1. A machine for topping tapered vegetables comprising endless conveyor means having transverse, spaced bars, vegetable orientating means for orientating vegetables fed onto the conveyor whereby any vegetables whose largest diameter is less than the spacing between the bars fall through the bars for discharge from the machine while larger vegetables become trapped between the bars with their tops projecting, and stationary cutting means positioned to engage and sever the projecting vegetable tops as these are moved by the conveyor means through a cutting station, said means for orienting the vegetables comprising a set of flaps, each flap being individually pivotally mounted on an axis transverse to the direction of movement of the conveyor means, said flaps being arranged to knock the vegetables to assist their correct orientation and also to knock said bars thereby setting up vibrations in the bars to shake the vegetables into position.

2. The machine as claimed in claim 1 wherein said conveyor means comprises a drumlike cage, adapted to rotate about a substantially horizontal axis, and having circular end plates spaced apart by said bars which form the circumference of the cage.

3. The machine as claimed in claim 2 wherein there is provided, below the cutting means, means internally of the cage for pressing out the topped vegetables from between the bars.

4. The machine as claimed in claim 2 wherein a fixed chute is provided inside said cage for discharging through an aperture in an end plate of the cage the undersized vegetables that have fallen through said bars.

5. The machine as claimed in claim 1, wherein means is provided for positioning the tops of the vegetables down to a predetermined level comprising a further set of flaps pivotal as a whole about an axis transverse to said conveyor means, the tips of said flaps being adjustable in height above the conveyor means so that vegetables passed beneath them are forced down to the predetermined level.

6. The machine as claimed in claim 2 provided internally of the cage with a soft resilient roller on an axis parallel or coaxial to the cage axis, the circumference of the roller engaging the bars and the roller being adapted to rotate with the cage to provide a support for the vegetables in the region of the cutting means.

7. The machine as claimed in claim 2 having rollers engaging end plates of the cage for frictionally driving the cage.

8. A two-stage vegetable-topping system comprising a first machine as claimed in claim 2 having discharge means for undersize vegetables adapted to feed a second machine as claimed in claim 2, the bars of the second machine being more closely spaced than the bars of the first machine.